US011186732B2

(12) United States Patent
Fleming

(10) Patent No.: US 11,186,732 B2
(45) Date of Patent: Nov. 30, 2021

(54) VERTICALLY-ALIGNED CARBON NANOTUBE SUBSTRATE HAVING INCREASED SURFACE AREA

(71) Applicant: IRONWOOD 12 LLC, Park City, UT (US)

(72) Inventor: Christopher J. Fleming, Vista, CA (US)

(73) Assignee: IRONWOOD 12 LLC, Park City, UT (US)

( * ) Notice: Subject to any disclaimer, the term of this patent is extended or adjusted under 35 U.S.C. 154(b) by 338 days.

(21) Appl. No.: 15/621,868

(22) Filed: Jun. 13, 2017

(65) Prior Publication Data

US 2017/0369716 A1    Dec. 28, 2017

Related U.S. Application Data

(60) Provisional application No. 62/355,243, filed on Jun. 27, 2016.

(51) Int. Cl.
    *B32B 9/00*      (2006.01)
    *C09D 5/22*      (2006.01)
    (Continued)

(52) U.S. Cl.
    CPC .............. *C09D 5/22* (2013.01); *B01J 19/081* (2013.01); *C01B 32/168* (2017.08); *B82Y 20/00* (2013.01);
    (Continued)

(58) Field of Classification Search
    CPC ....... C01B 31/04; Y10T 428/30; B82Y 30/00; B82Y 40/00
    (Continued)

(56) References Cited

U.S. PATENT DOCUMENTS

| 7,060,390 B2 | 6/2006 | Chen et al. |
| 7,086,451 B2 | 8/2006 | Leu et al. |

(Continued)

FOREIGN PATENT DOCUMENTS

| CN | 101794753 A | 8/2010 |
| CN | 101794753 B | 7/2011 |

OTHER PUBLICATIONS

Yook, Amino Functionation of Carbon Nanotube Surfaces with NH3 plasma treatment, Applied Surface Science 256, 6941-6944, Apr. 2010.*

(Continued)

*Primary Examiner* — Daniel H Miller
(74) *Attorney, Agent, or Firm* — Roeder & Broder LLP; James P. Broder

(57) ABSTRACT

A method for manufacturing a vertically aligned carbon nanotube substrate includes the steps of treating a vertically aligned carbon nanotube array in an untreated state with a plasma to generate a vertically aligned carbon nanotube array in a plasma-treated state and adhering a coating onto at least a portion of the vertically aligned carbon nanotube array in the plasma-treated state to generate a vertically aligned carbon nanotube array in a coated state. The step of treating can include exposing the vertically aligned carbon nanotube substrate in the untreated state to the plasma in a plasma chamber. The step of adhering can include using a process of thermal evaporation or e-beam ablation. The method can also include the step of adhering a plurality of fluorophores to at least a portion of the vertically aligned carbon nanotube array in the coated state.

20 Claims, 6 Drawing Sheets

(51) Int. Cl.
*B01J 19/08* (2006.01)
*C01B 32/168* (2017.01)
*B82Y 20/00* (2011.01)
*B82Y 40/00* (2011.01)
*B82Y 30/00* (2011.01)

(52) U.S. Cl.
CPC .............. *B82Y 30/00* (2013.01); *B82Y 40/00* (2013.01); *C01B 2202/08* (2013.01); *Y10S 977/745* (2013.01); *Y10S 977/847* (2013.01); *Y10S 977/95* (2013.01)

(58) Field of Classification Search
USPC ........................................ 428/408; 423/447.1
See application file for complete search history.

(56) References Cited

U.S. PATENT DOCUMENTS

| | | | |
|---|---|---|---|
| 7,109,581 | B2 | 9/2006 | Dangelo et al. |
| 7,316,061 | B2 | 1/2008 | Dubin et al. |
| 7,811,542 | B1 | 10/2010 | McElrath et al. |
| 8,309,051 | B2 | 11/2012 | Yao et al. |
| 8,702,897 | B2 | 4/2014 | Lin et al. |
| 9,067,791 | B2 | 6/2015 | Kim et al. |
| 2005/0230270 | A1 | 10/2005 | Ren et al. |
| 2006/0172179 | A1* | 8/2006 | Gu .................... B82Y 30/00 429/482 |
| 2007/0158584 | A1 | 7/2007 | Lin |
| 2007/0193143 | A1 | 8/2007 | Antonic |
| 2007/0257766 | A1 | 11/2007 | Richards et al. |
| 2008/0019485 | A1 | 1/2008 | Weiss et al. |
| 2008/0131722 | A1 | 6/2008 | Suhir |
| 2008/0317660 | A1 | 12/2008 | Pan et al. |
| 2009/0195989 | A1 | 8/2009 | Oda |
| 2009/0301993 | A1* | 12/2009 | Feng .................... B82Y 30/00 216/7 |
| 2010/0021736 | A1 | 1/2010 | Slinker |
| 2010/0313951 | A1 | 12/2010 | Nalamasu |
| 2011/0163296 | A1 | 7/2011 | Pace et al. |
| 2011/0177493 | A1 | 7/2011 | Lu |
| 2011/0189500 | A1 | 8/2011 | Majumdar et al. |
| 2012/0085526 | A1 | 4/2012 | Yeh |
| 2012/0321961 | A1 | 12/2012 | Yushin et al. |
| 2013/0256868 | A1 | 10/2013 | Aliyev |
| 2013/0342965 | A1 | 12/2013 | Fujita |
| 2014/0015158 | A1 | 1/2014 | Cola |
| 2016/0052094 | A1 | 2/2016 | Fleming et al. |
| 2016/0200577 | A1 | 7/2016 | Cornwell et al. |
| 2017/0131287 | A1* | 5/2017 | McNicholas ............ C12Q 1/54 |

OTHER PUBLICATIONS

Office Action dated Jun. 1, 2017 in U.S. Appl. No. 14/818,867, filed Aug. 5, 2015 by Fleming et al., with its entire prosecution and file history.
Ji et al., "Wettability Control of VACNT Array through Atmospheric Plasma Treatment", Journal of Heat Transfer, Feb. 2015, p. 020903-1, vol. 137, 2015.
Lauren, Susanna, "Why is Contact Angle Important?", Biolin Scientific, Surface Science Blog, https://www.biolinscientific.com/blog/why-is-contact-angle-important, 2018.

* cited by examiner

VERTICALLY-ALIGNED CARBON NANOTUBE SUBSTRATE HAVING INCREASED SURFACE AREA

RELATED APPLICATION

This application claims priority on U.S. Provisional Application Ser. No. 62/355,243, filed on Jun. 27, 2016 and entitled "THREE-DIMENSIONAL HIERARCHICALLY-STRUCTURED VERTICALLY-ALIGNED CARBON NANOTUBE SUBSTRATES FOR FLUORESCENCE-BASED ASSAYS". As far as permitted, the contents of U.S. Provisional Application Ser. No. 62/355,243 are incorporated herein by reference.

BACKGROUND

The current technology for fluorescent detection of secondary or tertiary adsorption is reaching its limits for one simple reason: fluorescent domains of ever-decreasing size fluoresce proportionally to their footprint area (for any given fluorophore). The two-dimensional confinement limits fluorescence intensity by lessening the available fluorophore area, thus reducing the number of photons emitted as the domain size is reduced.

SUMMARY

The present invention is directed toward a method for manufacturing a vertically aligned carbon nanotube substrate having increased surface area. In certain embodiments, the method includes the steps of treating a vertically aligned carbon nanotube array in an untreated state with a plasma to generate a vertically aligned carbon nanotube array in a plasma-treated state and adhering a transition metal coating onto at least a portion of the vertically aligned carbon nanotube array in the plasma-treated state to generate a vertically aligned carbon nanotube array in a coated state.

In various embodiments, the step of treating can include exposing the vertically aligned carbon nanotube array in the untreated state to the plasma in a plasma chamber. In one embodiment, the plasma can include an ammonia plasma. In certain embodiments, the step of exposing can include using a flow rate that is greater than approximately 2 standard cubic centimeters per minute and less than approximately 15 standard cubic centimeters per minute. In other embodiments, the step of exposing can include using a power that is greater than approximately 5 watts and less than approximately 75 watts.

In certain embodiments, the step of adhering can include using a process of thermal evaporation. In other embodiments, the step of adhering can include using a process of e-beam ablation.

In some embodiments, the method can also include the step of adhering a plurality of fluorophores to at least a portion of the vertically aligned carbon nanotube array in the coated state. In such embodiments, the step of adhering the plurality of fluorophores can include the fluorophores being adsorbed onto the transition metal coating.

In certain embodiments, the present invention is also directed toward a method for manufacturing a vertically aligned carbon nanotube substrate, including the steps of treating a vertically aligned carbon nanotube array in an untreated state with an ammonia plasma to generate a vertically aligned carbon nanotube array in a plasma-treated state and adhering a metallic coating onto at least a portion of the vertically aligned carbon nanotube array in the plasma-treated state to generate a vertically aligned carbon nanotube array in a coated state.

In various embodiments, the step of treating can include exposing the vertically aligned carbon nanotube array in the untreated state to the ammonia plasma in a plasma chamber. In certain embodiments, the step of exposing can include using a flow rate that is greater than approximately 2 standard cubic centimeters per minute and less than approximately 15 standard cubic centimeters per minute. In other embodiments, the step of exposing can include using a power that is greater than approximately 5 watts and less than approximately 75 watts.

In certain embodiments, the coating can include a transition metal. Further, in other embodiments, the coating can include silane.

In certain embodiments, the step of adhering can include using a process of thermal evaporation. In other embodiments, the step of adhering can include using a process of e-beam ablation.

In some embodiments, the method can also include the step of adhering a plurality of fluorophores to at least a portion of the vertically aligned carbon nanotube array in the coated state. In such embodiments, the step of adhering the plurality of fluorophores can include the fluorophores being adsorbed onto the coating.

The present invention is also directed toward a vertically aligned carbon nanotube substrate. In various embodiments, the vertically aligned carbon nanotube substrate comprises a vertically aligned carbon nanotube array that has been treated with an ammonia plasma and a coating adhered onto at least a portion of the ammonia plasma-treated vertically aligned carbon nanotube array. In certain embodiments, the vertically aligned carbon nanotube substrate can further comprise a plurality of fluorophores that are adhered to at least a portion of the coated vertically aligned carbon nanotube array. In some embodiments, the coating can include a transition metal.

The present invention is also directed toward a vertically aligned carbon nanotube substrate. In certain embodiments, the vertically aligned carbon nanotube substrate comprises a vertically aligned carbon nanotube array that has been treated with a plasma and a coating that is adhered to at least a portion of the plasma-treated vertically aligned carbon nanotube array, the coating including a transition metal. In some embodiments, the vertically aligned carbon nanotube substrate can further comprise a plurality of fluorophores that are adhered to at least a portion of the coated vertically aligned carbon nanotube array.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a vertically aligned carbon nanotube substrate and a method for manufacturing the vertically aligned carbon nanotube substrate. Those of ordinary skill in the art will realize that the following detailed description of the present invention is illustrative only and is not intended to be in any way limiting. Other embodiments of the present invention will readily suggest themselves to such skilled persons having the benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

As an overview, the vertically aligned carbon nanotube (also sometimes referred to herein as "VACNT") substrate described herein overcomes two-dimensional spatial confinement of primary, secondary, tertiary, etc. adsorbates. Additionally, or in the alternative, the VACNT substrate allows for collimated addition of fluorescence intensity leading to a substantial increase in signal-to-noise upon emission. Moreover, the VACNT substrate can provide further reduction of substrate surface areas.

Figure 1:
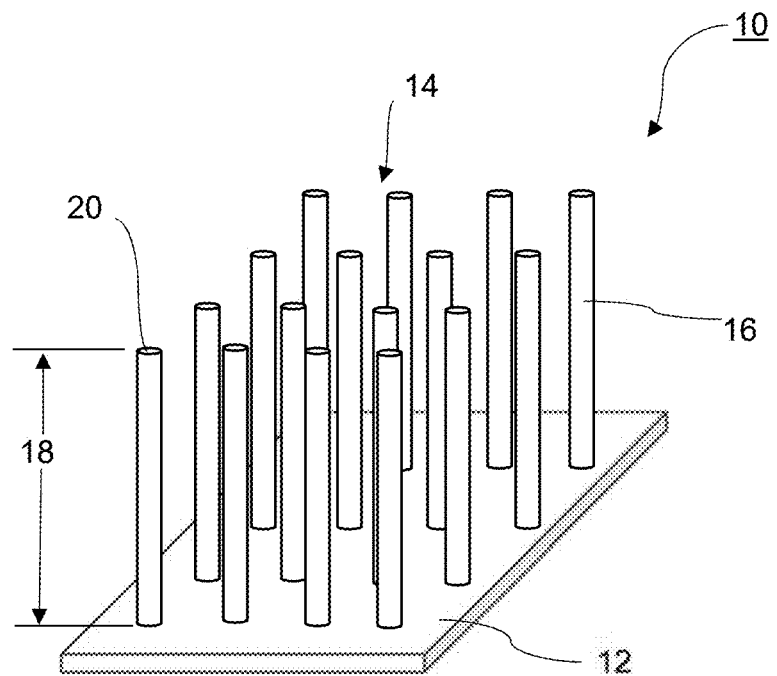
FIG. 1 is a simplified perspective view illustration of one embodiment of a portion of a vertically aligned carbon nanotube substrate having features of the present invention.

FIG. 1 is a simplified perspective view of one embodiment of a portion of the VACNT substrate 10. It is understood that, although not illustrated and/or described relative to FIG. 1, the VACNT substrate 10 can also include one or more of the structures or embodiments described in greater detail herein. The VACNT substrate 10 has a three-dimensional surface area. The size and shape of the VACNT substrate 10 can be varied. It is recognized that the simplified perspective view of the VACNT substrate 10 illustrated in FIG. 1 is for representative purposes only, and that any suitable VACNT substrate 10 can be used in accordance with the methods disclosed herein. In various embodiments, the VACNT substrate 10 can include a base 12 and a VACNT array 14.

The base 12 is the surface upon which the VACNT array 14 can grow. In this embodiment, the base 12 has a rectangular footprint. Alternatively, the base 12 can have any suitably shaped footprint. In various embodiments, depending on the shape of the footprint, the base 12 can also have a varying surface area. In one embodiment, the base 12 can be formed from a silicon (Si) wafer. Alternatively, the base 12 may be formed from any other suitable material.

The VACNT array 14 can be produced using a variety of methods and catalysts. The design of the VACNT array 14 can be varied. The VACNT array 14 can include a plurality of nanotubes 16. The nanotubes 16 can have extremely small diameters in the nanoscale. In the embodiment illustrated in FIG. 1, the VACNT array 14 has a relatively small number of nanotubes 16. It is recognized that a typical VACNT array 14 can have thousands, millions, billions or even trillions of nanotubes 16. In alternative embodiments, the VACNT array 14 can include any number of nanotubes 16. It is understood that for ease in understanding the portion of the VACNT array 14 illustrated in FIG. 1 is not shown to scale.

Further, the VACNT array 14 can include a varying density of nanotubes 16. Depending on the method and catalyst used to produce the VACNT array 14, several types of nanotubes 16 with numerous morphologies may result. In one embodiment, the VACNT array 14 can include nanotubes 16 with diameters of approximately 20 nanometers ("nm"). Alternatively, the nanotubes 16 can have a diameter greater than approximately 20 nm or less than approximately 20 nm. The nanotubes 16 can be fibrous or rough. In addition, the nanotubes 16 can grow or extend away from the base 12 in a direction that is substantially normal to the base 12. Alternatively, the nanotubes 16 can grow or extend away from the base 12 in a direction that is less than 90 degrees relative to the base 12.

Furthermore, each nanotube 16 has a nanotube height 18 and a nanotube tip 20. The nanotube height 18 is measured from a point of contact between the nanotube 16 and the base 12 and extending to the nanotube tip 20. The nanotube tip 20 can be located at or near the end point or tip of the nanotube 16. In alternative embodiments, the nanotube height 18 can be measured in any suitable manner known to those skilled in the art. In one non-exclusive embodiment, the nanotubes 16 can have the nanotube height 18 of approximately 1 millimeter ("mm"). In alternative embodiments, the nanotube height 18 can be varied, i.e., greater or less than approximately 1 mm.

In contrast to the VACNT substrate 10, a flat substrate (also sometimes referred to herein as a "conventional substrate") does not include the VACNT array 14. Generally, the conventional substrate only includes a base 12. As such, in certain embodiments, the VACNT substrate 10 shown and described herein can yield a significantly increased surface area when compared to the conventional substrate that has a similarly shaped footprint and/or base surface area. As one non-exclusive example, the VACNT substrate 10 can yield approximately a 77-fold increase when compared to the conventional substrate that has a similarly shaped footprint and/or base surface area. In other embodiments, the VACNT substrate 10 can yield an increase that is greater than approximately 77-fold and/or less than approximately 77-fold. This increased surface area provided by the VACNT substrate 10 over the conventional substrate can result in one or more of the following advantages: an increased fluorescence emission intensity, an increased signal to noise ratio and/or an allowable decrease in surface area of the footprint and/or base 12 of the VACNT substrate 10.

Figure 2A:
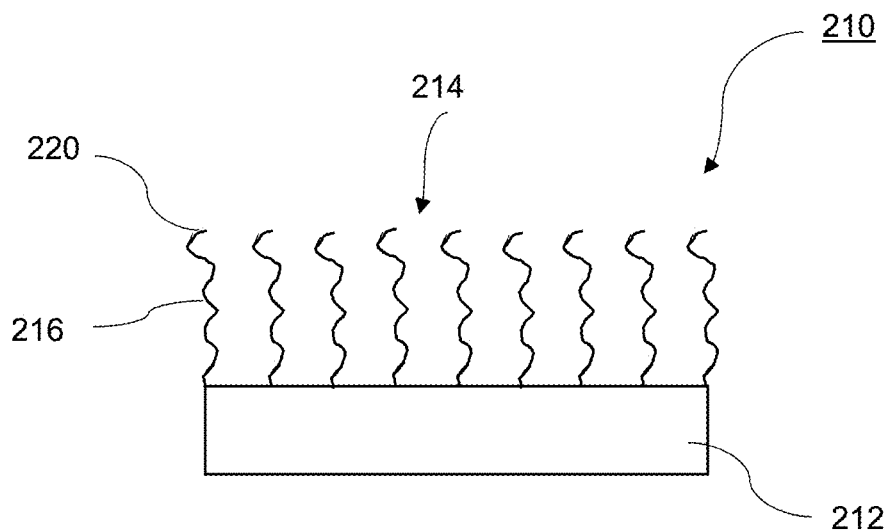
FIG. 2A is a simplified side view illustration of an embodiment of a portion of a vertically aligned carbon nanotube substrate shown in an untreated state.

FIG. 2A is a simplified side view illustration of an embodiment of a portion of a VACNT substrate 210 shown in an untreated state. The untreated state can include any state where the VACNT substrate 210 has not been treated with or exposed to a plasma 322 (illustrated in FIG. 3A). In various embodiments, the VACNT substrate 210 in the untreated state can include a VACNT array 214 in the untreated state and the base 212. In such embodiments, the VACNT array 214 in the untreated state is generally hydrophobic. Each VACNT array 214 in the untreated state includes a plurality of nanotubes 216 in the untreated state. The nanotubes 216 in the untreated state also include nanotube tips 220 in the untreated state. As shown in FIG. 2A, the nanotubes 216, and their tips 220, in the untreated state can be relatively disorganized and not consistently vertically aligned with one another.

Figure 2B:
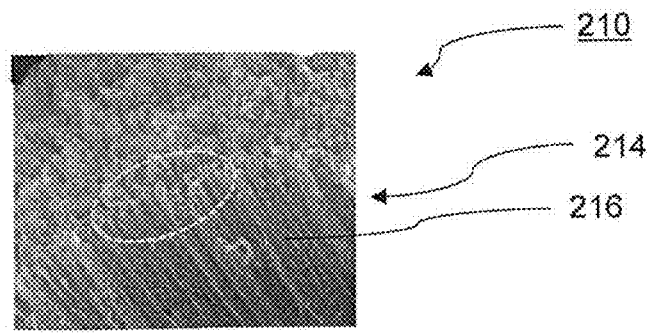
FIG. 2B is a perspective view of a scanning electron microscopy image of one embodiment of a portion of the vertically aligned carbon nanotube substrate shown in the untreated state.

FIG. 2B is a perspective view of a scanning electron microscopy image of one embodiment of a portion of the VACNT substrate 210 shown in the untreated state. The image in FIG. 2B shows the VACNT array 214, including the nanotubes 216 that make up the VACNT array 214, is relatively tangled, not consistently aligned, relatively disorganized and/or somewhat clustered while in the untreated state.

Figure 2C:
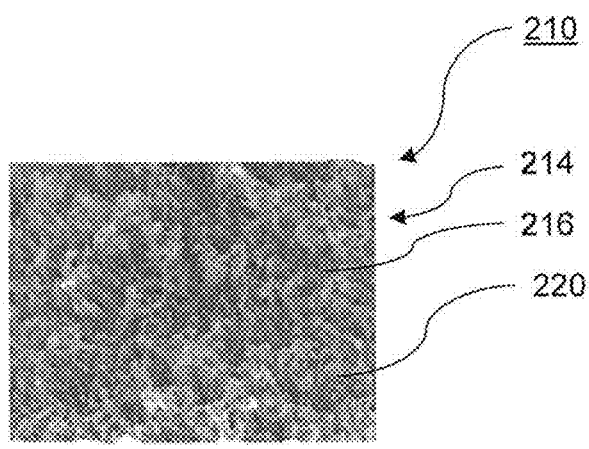
FIG. 2C is a close-up perspective view of the scanning electron microscopy image of a portion of the vertically aligned carbon nanotube substrate illustrated in a dashed oval in FIG. 2B.

FIG. 2C is a close-up perspective view of the scanning electron microscopy image of a portion of the VACNT substrate 210 illustrated in the dashed oval in FIG. 2B. The image in FIG. 2C also shows the VACNT array 214, including the nanotubes 216, while in the untreated state. The image in FIG. 2C more clearly shows the nanotube tips 220 in the untreated state are relatively tangled, not consistently aligned, relatively disorganized and/or somewhat clustered.

Figure 3A:
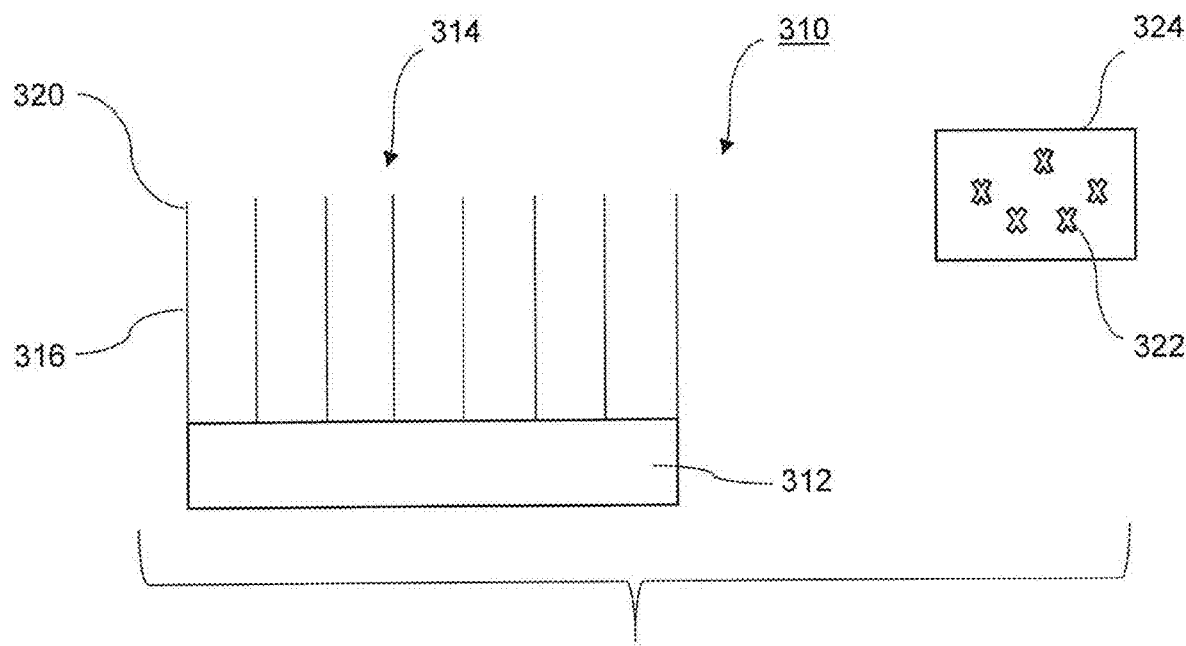
FIG. 3A is a simplified side view illustration of an embodiment of a plasma, a plasma chamber and a portion of a vertically aligned carbon nanotube substrate shown in a plasma-treated state.

FIG. 3A is a simplified side view illustration of an embodiment of a plasma 322, a plasma chamber 324 and a portion of a VACNT substrate 310 shown in a plasma-treated state. The plasma-treated state can include the state where at least a portion of the VACNT substrate 210 (illustrated in FIG. 2A, for example) in the untreated state has been treated with or exposed to the plasma 322. In accordance with the methods disclosed herein, in certain embodiments, at least a portion of the VACNT substrate 210 in the untreated state has been treated with or exposed to the plasma 322 to generate the VACNT substrate 310 in the plasma-treated state. In various embodiments, the VACNT substrate 210 in the untreated state can be treated with or exposed to the plasma 322 in the plasma chamber 324. Alternatively, the VACNT substrate 210 in the untreated state can be treated with or exposed to the plasma 322 in any suitable manner.

In one non-exclusive embodiment, the plasma 322 may include ammonia. In other embodiments, the plasma 322 can include any other suitable compound, combination or composition.

In various embodiments, the VACNT substrate 310 in the plasma-treated state can include a VACNT array 314 in the plasma-treated state and the base 312. Each VACNT array 314 in the plasma-treated state includes a plurality of nanotubes 316 in the plasma-treated state. In certain embodiments, the nanotubes 316 in the plasma-treated state have been at least partially treated with the plasma 322. The nanotubes 316 in the plasma-treated state also include nanotube tips 320 in the plasma-treated state. In certain embodiments, the nanotube tips 320 in the plasma-treated state have been at least partially treated with the plasma 322. In some such embodiments, after treatment, the VACNT array 314 in the plasma-treated state can gain hydrophilicity. Further, as a result of the plasma treatment, the nanotubes 316, and their tips 320, in the plasma-treated state become substantially less tangled, less clustered and better organized with increased consistency.

Figure 3B:
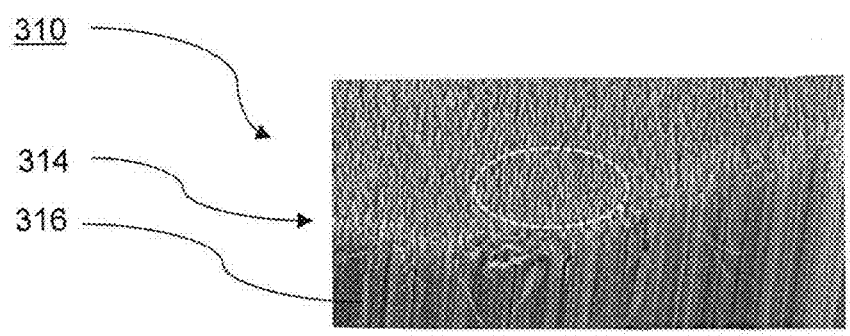
FIG. 3B is a perspective view of a scanning electron microscopy image of one embodiment of a portion of the vertically aligned carbon nanotube substrate shown in the plasma-treated state.

FIG. 3B is a perspective view of a scanning electron microscopy image of one embodiment of a portion of the VACNT substrate 310 shown in the plasma-treated state. The image of FIG. 3B shows the VACNT array 314, including the nanotubes 316 that make up the VACNT array 314, has become substantially straightened vertically and are better aligned with one another while in the plasma-treated state.

Figure 3C:
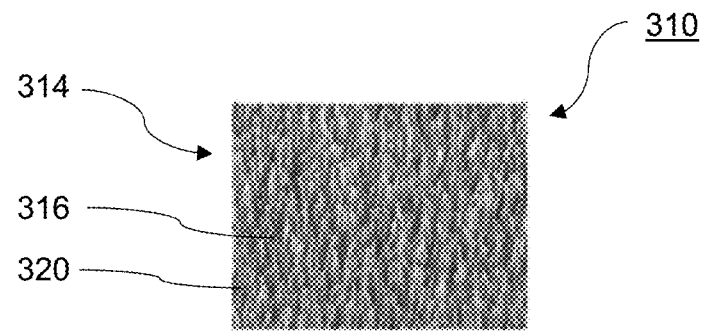
FIG. 3C is a close-up perspective view of the scanning electron microscopy image of a portion of the vertically aligned carbon nanotube substrate illustrated in a dashed oval in FIG. 3B.

FIG. 3C is a close-up perspective view of the scanning electron microscopy image of a portion of the VACNT substrate 310 illustrated in the dashed oval in FIG. 3B. The image in FIG. 3C also shows the VACNT array 314, including the nanotubes 316, while in the plasma-treated state. The image of FIG. 3C more clearly shows the nanotube tips 320 in the plasma-treated state have become substantially straightened vertically and aligned.

Figure 4:
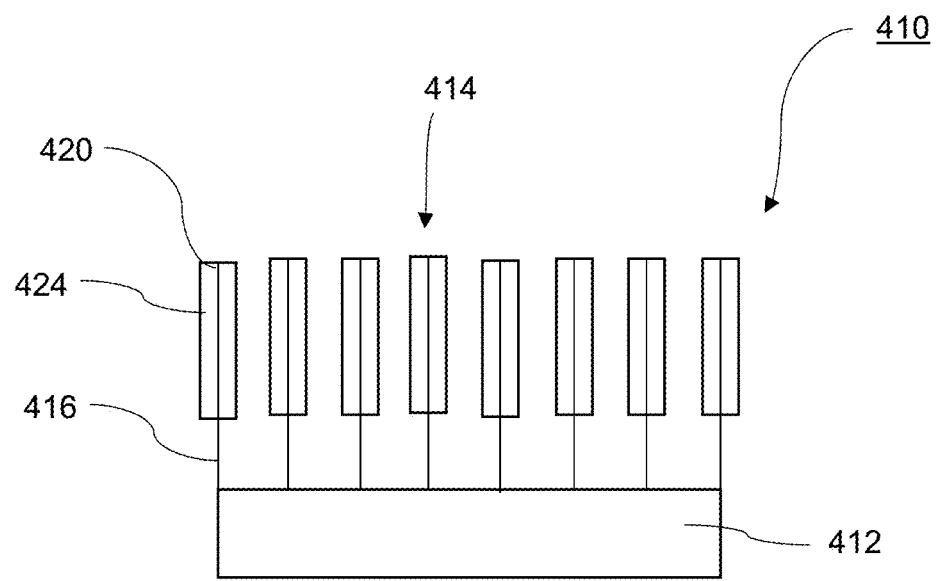
FIG. 4 is a simplified side view illustration of an embodiment of a portion of a vertically aligned carbon nanotube substrate shown in a coated state.

FIG. 4 is a simplified side view illustration of an embodiment of a portion of a VACNT substrate 410 shown in a coated state. The coated state can include the state where a coating 424 has been adhered to at least a portion of the VACNT substrate 310 (illustrated in FIG. 3A, for example) in the plasma-treated state. Additionally, the coated state can include the state where the coating 424 has been adhered to at least a portion of the VACNT substrate 210 in the untreated state. In the embodiment illustrated in FIG. 4, the coating 424 has been adhered to a portion of the VACNT array 314 (illustrated in FIG. 3A, for example) in the plasma-treated state. In various embodiments, the coating 424 can include any metallic or metal material, or metal alloys. In some embodiments, the metallic or metal material can include any suitable transition metal. In one non-exclusive embodiment, the metallic or metal material can include gold ("Au"). In other non-exclusive embodiments, the coating 424 can include any rare earth combination known to those skilled in the art. Additionally and/or alternatively, the coating 424 may also include silane or silica.

Further, in some embodiments, the coating 424 can be adhered to a portion of the VACNT array 314 in the plasma-treated state using a process of thermal evaporation and/or e-beam ablation. In other embodiments, the coating 424 can be adhered to a portion of the VACNT array 214 (illustrated in FIG. 2A, for example) in the untreated state. In alternative embodiments, the coating 424 can be adhered to a portion of the VACNT array 314 in the plasma-treated state or a portion of the VACNT array 214 in the untreated state using any suitable method or process.

In various embodiments, the VACNT substrate 410 in the coated state can include a VACNT array 414 in the coated state and the base 412. Each VACNT array 414 in the coated state can also include a plurality of nanotubes 416 in the coated state. In certain embodiments, the nanotubes 416 in the coated state have been at least partially coated with the coating 424. The nanotubes 416 in the coated state also include nanotube tips 420 in the coated state. In the embodiment illustrated in FIG. 4, the nanotubes 416, including the nanotube tips 420, have been at least partially, if not fully, coated with the coating 424.

Figure 5:
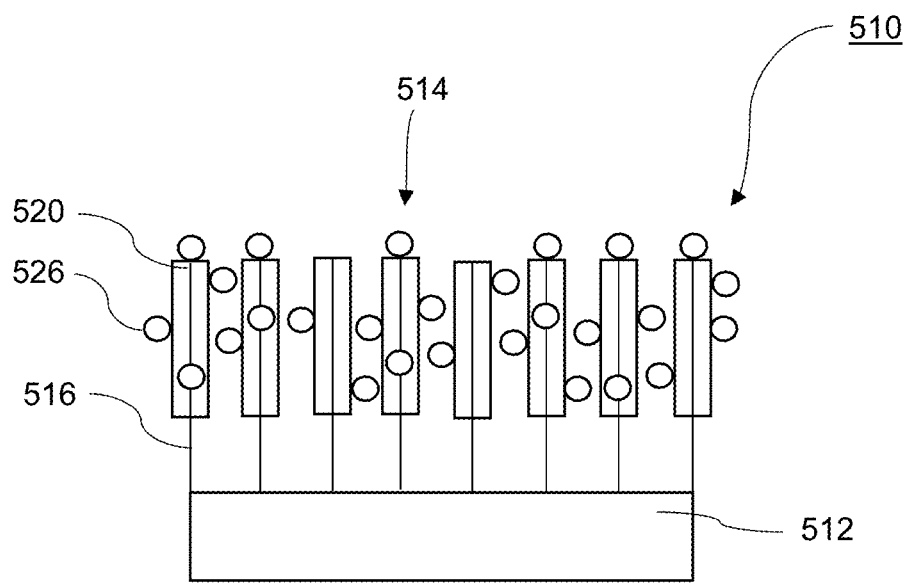
FIG. 5 is a simplified side view illustration of an embodiment of a portion of a vertically aligned carbon nanotube substrate shown in a fluorophore-exposed state.

FIG. 5 is a simplified side view illustration of an embodiment of a portion of a VACNT substrate 510 shown in a fluorophore-exposed state. The fluorophore-exposed state can include the state where a plurality of fluorophores 526 has been adhered to a portion of the VACNT substrate 410 (illustrated in FIG. 4) in the coated state. Additionally, the fluorophore-exposed state can include the state where the plurality of fluorophores 526 has been adhered to at least a portion of the VACNT substrate 310 (illustrated in FIG. 3A, for example) in the plasma-treated state or at least a portion of the VACNT substrate 210 (illustrated in FIG. 2A, for example) in the untreated state. In the embodiment illustrated in FIG. 4, the plurality of fluorophores 526 has been adhered to the VACNT array 414 (illustrated in FIG. 4) in the coated state. In various embodiments, any suitable type of fluorophore 526 can be used. In alternative embodiments, any molecule known to those skilled in the art can be used in place of the fluorophore 526. Further, any suitable method or process for adhering the plurality of fluorophores 526 to the VACNT array 414 in the coated state can be used.

In various embodiments, the VACNT substrate 510 in the fluorophore-exposed state can include a VACNT array 514 in the fluorophore-exposed state and the base 512. Each VACNT array 514 in the fluorophore-exposed state can also include nanotubes 516 in the fluorophore-exposed state. In certain embodiments, the fluorophores 526 can adhere at least partially to the nanotubes 516 in the fluorophore-exposed state. The nanotubes 516 in the fluorophore-exposed state also include nanotube tips 520 in the fluorophore-exposed state. In certain embodiments, at least some of the fluorophores 526 can adhere to the nanotube tips 520 (and/or other portions of the nanotubes 516) in the fluorophore-exposed state.

The VACNT substrate 510 in the fluorophore-exposed state can have an increased brightness level and brightness intensity when compared to the conventional substrate. In one non-exclusive example, the VACNT substrate 510 in the fluorophore-exposed state can yield the brightness level that is approximately 235 times greater than a brightness level of the conventional substrate that has the similarly shaped footprint and/or base surface area. Alternatively, the VACNT substrate 510 in the fluorophore-exposed state can yield the brightness level that is greater or less than an increase of approximately 235 times greater than the conventional substrate that has the similarly shaped footprint and/or base surface area. Further, as another non-exclusive example, fluorescence on top of the VACNT array 514 in the fluorophore-exposed state can have a brightness intensity that is 448 times greater than a brightness level of the conventional substrate. Alternatively, the VACNT array 514 in the fluorophore-exposed state can yield the brightness intensity that is greater or less than an increase of 448. In various embodiments, a phonon-polaron coupling with the organic (fluorophore) layer is relatively long range, e.g. approximately greater than 3-4 nm. Because of the greater saturation of fluorophores using the system and methods provided herein, the relatively long range coupling can still produce significant and/or greatly improved fluorescence amplification.

Furthermore, in various embodiments, fluorescence intensity can be proportional to the nanotube height 18 (illustrated in FIG. 1) within the VACNT array 514 in the fluorophore-exposed state. As non-exclusive examples, the average nanotube height 18 of 2.8±0.5 nm has the fluorescence intensity greater than the nanotube heights 18 of 2.2 nm or 1.6 nm.

Figure 6:
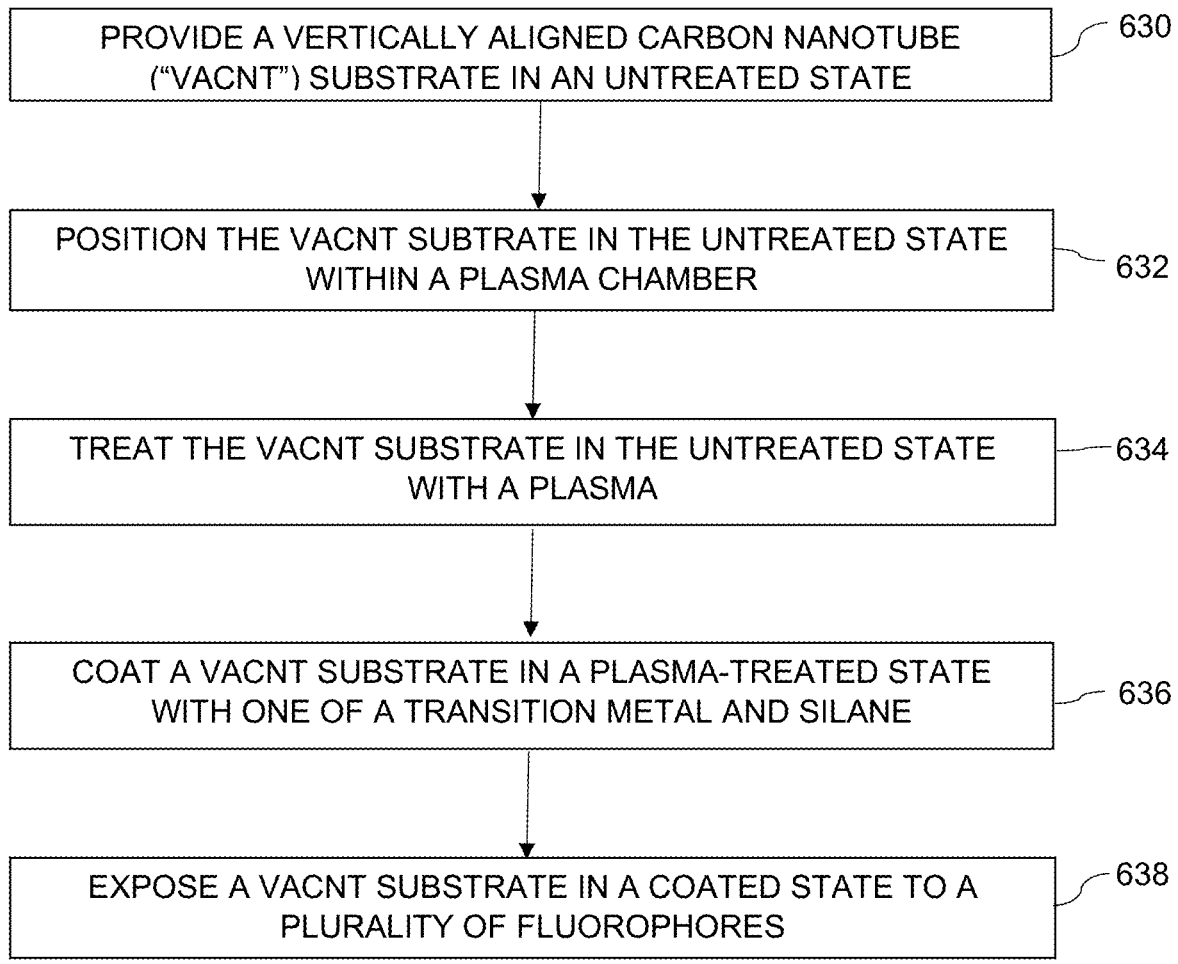
FIG. 6 is a flowchart that describes one embodiment of a method for manufacturing the vertically aligned carbon nanotube substrate.

FIG. 6 is a flowchart that describes one embodiment of a method for manufacturing the VACNT substrate. It is understood that the various steps described herein can be modified as necessary in the process of manufacturing the VACNT substrate. Additionally, it should also be appreciated that in certain applications the order of the steps can be modified, certain steps can be omitted, and/or additional steps can be added without limiting the intended scope and breadth of the present invention.

At step 630, the VACNT substrate in the untreated state is provided. One or more different VACNT substrates in the untreated state can be selected. In various embodiments, the VACNT substrate in the untreated state can include the VACNT array in the untreated state and the base. Each VACNT array in the untreated state can also include nanotubes in the untreated state. The VACNT array, including the nanotubes that make up the untreated VACNT array, is generally tangled, not consistently aligned, relatively disorganized and/or somewhat clustered while in the untreated state.

At step 632, the VACNT substrate in the untreated state can be positioned within the plasma chamber. In various embodiments, the VACNT substrate in the untreated state can be treated with and/or exposed to the plasma in the plasma chamber. Alternatively, the VACNT substrate in the untreated state can be treated with or exposed to the plasma in any other suitable manner. In one non-exclusive embodiment, the plasma chamber can include an induction coil that surrounds the plasma chamber which inductively-couples into a gas and transforms it into the plasma. In alternative embodiments, the design of the plasma chamber can be varied. In other embodiments, the plasma chamber can include a relatively low-temperature and/or a relatively low-pressure. Alternatively, the plasma chamber can use any parameters known to those skilled in the art that can transform the gas into the plasma.

At step 634, the VACNT substrate in the untreated state can be treated with or exposed to the plasma. Once the VACNT substrate in the untreated state is positioned within the plasma chamber, in certain non-exclusive embodiments, the plasma is formed within the plasma chamber using a gas flow rate, a power and/or a pressure low enough to allow the plasma to form. Alternatively, any other parameters known to those skilled in the art can be used with the plasma chamber to transform the gas into the plasma. As one non-exclusive example, an ammonia ("$NH_3$") gas, can be used. In such embodiment, the plasma chamber can transform the ammonia gas into an ammonia plasma. In alternative embodiments, any small-molecule, non-oxidizing gas, or any other gas known to those skilled in the art can be used. Still alternatively, $NH_2R$, $NHR_2$ and $NR_3$, where R is any non-oxidizing oligo, organic, or metal substituted chain can be used.

In certain embodiments, the gas flow rate can be varied to suit a specific composition of the gas. For example, in some embodiments, the gas flow rate can be greater than approximately 2 standard cubic centimeters per minute ("sccm") and less than approximately 15 sccm. More particularly, in various alternative embodiments, the gas flow rate can be at least approximately 2 sccm, 3 sccm, 4 sccm, 5 sccm, 6 sccm, 7 sccm, 8 sccm, 9 sccm, 10 sccm, 11 sccm, 12 sccm, 13 sccm, 14 sccm or 15 sccm. Alternatively, the gas flow rate can be greater than 15 sccm or less than 2 sccm.

Additionally, in certain embodiments, the power can be varied to suit the specific composition of the gas. For example, in some embodiments, the power can be greater than approximately 5 watts ("W") and less than approximately 75 W. More particularly, in various alternative embodiments, the power can be at least approximately 5 W, 10 W, 15 W, 20 W, 25 W, 30 W, 35 W, 40 W, 45 W, 50 W, 55 W, 60 W, 65 W, 70 W or 75 W. Alternatively, the power can be greater than 75 W or less than 5 W.

Furthermore, in other embodiments, the pressure can also be varied. For example, in some embodiments, the pressure can be greater than approximately 10 millitorr ("mTorr") and less than approximately 100 mTorr. More particularly, in various alternative embodiments, the pressure can be at least approximately 10 mTorr, 20 mTorr, 30 mTorr, 40 mTorr, 50 mTorr, 60 mTorr, 70 mTorr, 80 mTorr, 90 mTorr and 100 mTorr. Alternatively, the pressure can be greater than 100 mTorr or less than 10 mTorr.

In various embodiments, one or more of the following advantages are realized due to the plasma treatment: the VACNT array in the plasma-treated state gains hydrophilicity, e.g., becomes more water-accessible. As one non-exclusive example, exposure of the VACNT substrate in the untreated state to the ammonia plasma allows a relative increase in hydrophilicity over that which has been observed using oxidation. In addition, in other certain embodiments, the VACNT array in the plasma-treated state may become substantially more organized vertically, and relatively less tangled and/or less clustered.

At step 636, after treatment or exposure with the plasma, in various embodiments, the coating can be adhered to a portion of the VACNT substrate in the plasma-treated state. In other embodiments, the coating can be adhered to a portion of the VACNT substrate in the untreated state. The coating can include any suitable metallic or metal material. In some embodiments, the metallic, metal alloy or other metal material can include any suitable transition metal. In one non-exclusive embodiment, the metallic or metal material may include gold ("Au"). In other embodiments, the coating can include any rare earth combination known to those skilled in the art. In alternative embodiments, the coating can include silane. In yet other alternative embodiments, silica can be used.

In various embodiments, the coating can extend from the nanotube tips and down the nanotubes, i.e., into the VACNT array. In one non-exclusive embodiment, the coating can extend down the nanotubes in the coated state approximately 2 micrometers. In alternative embodiments, the coating can extend down the nanotubes in the coated state greater than approximately 2 micrometers and/or less than approximately 2 micrometers. Further, in one non-exclusive embodiment, the coating can adhere to greater than approximately 5% and less than 100% of individual nanotubes in the VACNT array in the coated state. More particularly, in various alternative embodiments, the coating can adhere to at least approximately 5%, 10%, 20%, 30%, 40%, 50%, 60%, 70%, 80%, 90%, 95% or 99% of individual nanotubes in the VACNT array in the coated state. Alternatively, the coating can adhere to less than 5% or any other suitable percentage of individual nanotubes in the VACNT array in the coated state.

In various embodiments, the coating can include a quartz crystal microbalance ("QCM") thickness of greater than approximately 100 nm and less than approximately 300 nm. More particularly, in various alternative embodiments, the QCM thickness can be at least approximately 100 nm, 150 nm, 200 nm, 250 nm, or 300 nm. Alternatively, the QCM thickness can be greater than 300 nm or less than 100 nm.

In certain embodiments, the coating may be adhered to a portion of the VACNT array in the plasma-treated state using the process of thermal evaporation or e-beam ablation. Additionally and/or alternatively, the coating may be adhered to a portion of the VACNT array in the plasma-treated state via any other suitable method or process known to those skilled in the art.

At step 638, in various embodiments, to achieve fluorescence, the plurality of fluorophores can be adhered to a portion of the VACNT substrate in the coated state, e.g., the fluorophores can be are adsorbed onto the coating. In alternative embodiments, the plurality of fluorophores may be adhered to the VACNT substrate in one of the untreated state or plasma-treated state. In certain embodiments, any fluorophore may be used to achieve fluorescence. In other embodiments, any molecule known to those skilled in the art may be used to achieve fluorescence. Further, any suitable method or process for adhering the fluorophore to at least a portion of the VACNT substrate in the coated state can be used.

It is understood that although a number of different embodiments of systems and methods of manufacture of the VACNT substrate 10 have been described herein, one or more features of any one embodiment can be combined with one or more features of one or more of the other embodiment, provided that such combination satisfies the intent of the present invention.

While a number of exemplary aspects and embodiments of systems and methods of manufacture of the VACNT substrate 10 having increased surface areas have been shown and disclosed herein above, those of skill in the art will recognize certain modifications, permutations, additions and sub-combinations thereof. It is therefore intended that the system and method shall be interpreted to include all such modifications, permutations, additions and sub-combinations as are within their true spirit and scope, and no limitations are intended to the details of construction or design herein shown.

What is claimed is:

1. A method for manufacturing a vertically aligned carbon nanotube substrate having increased surface area, the method comprising the steps of:
   providing a vertically aligned carbon nanotube array in an untreated state;
   treating the vertically aligned carbon nanotube array with a plasma so that the vertically aligned carbon nanotube array is in a treated state and so that the vertically aligned carbon nanotube array becomes at least one of straightened vertically and hydrophilic;
   coating the vertically aligned carbon nanotube array in the treated state with a metal coating that only partially coats the vertically aligned carbon nanotube array so that the vertically aligned carbon nanotube array is in a coated state; and
   adhering a plurality of fluorophores to the vertically aligned carbon nanotube array while the vertically aligned carbon nanotube array is in the coated state.

2. The method of claim 1 wherein the step of treating includes exposing the vertically aligned carbon nanotube array in the untreated state to the plasma in a plasma chamber.

3. The method of claim 1 wherein the plasma includes ammonia.

4. The method of claim 1 wherein the step of coating includes using a process of thermal evaporation.

5. The method of claim 1 wherein the step of coating includes using a process of e-beam ablation.

6. The method of claim 1 wherein the step of adhering the plurality of fluorophores includes the fluorophores being adsorbed onto the metal coating.

7. The method of claim 1 wherein the vertically aligned carbon nanotube array includes a plurality of nanotube tips.

8. The method of claim 7 wherein the step of coating includes coating the plurality of nanotube tips.

9. The method of claim 1 wherein the metal coating includes silane.

10. A method for manufacturing a vertically aligned carbon nanotube substrate having increased surface area, the method comprising the steps of:
   providing a vertically aligned carbon nanotube array in an untreated state;
   treating the vertically aligned carbon nanotube array with a plasma so that the vertically aligned carbon nanotube array is in a treated state and so that the vertically aligned carbon nanotube array becomes at least one of straightened vertically and hydrophilic;
   coating the vertically aligned carbon nanotube array in the treated state with a metal coating that only partially coats the vertically aligned carbon nanotube array so that the vertically aligned carbon nanotube array is in a coated state; and
   adhering a plurality of fluorophores to the vertically aligned carbon nanotube array while the vertically aligned carbon nanotube array is in the coated state;
   wherein the vertically aligned carbon nanotube array is configured to collimate a fluorescence intensity from the plurality of fluorophores.

11. The method of claim 10 wherein the step of treating includes exposing the vertically aligned carbon nanotube array in the untreated state to the plasma in a plasma chamber.

12. The method of claim 10 wherein the plasma includes ammonia.

13. The method of claim 10 wherein the step of coating includes using a process of thermal evaporation.

14. The method of claim 10 wherein the step of coating includes using a process of e-beam ablation.

15. The method of claim 10 wherein the step of adhering the plurality of fluorophores includes the fluorophores being adsorbed onto the metal coating.

16. The method of claim 10 wherein the vertically aligned carbon nanotube array includes a plurality of nanotube tips.

17. The method of claim 16 wherein the step of coating includes coating the plurality of nanotube tips.

18. The method of claim 10 wherein the metal coating includes silane.

19. The method of claim 10 wherein the step of adhering includes using a flow rate that is greater than approximately 2 standard cubic centimeters per minute and less than approximately 15 standard cubic centimeters per minute.

20. A method for manufacturing a vertically aligned carbon nanotube substrate having increased surface area, the method comprising the steps of:
   providing a base;
   growing a vertically aligned carbon nanotube array on the base in an untreated state, the vertically aligned carbon nanotube array having a plurality of nanotube tips;
   treating the vertically aligned carbon nanotube array and the plurality of nanotube tips with a plasma so that the so the vertically aligned carbon nanotube array and the plurality of nanotube tips are in a treated state and so that the vertically aligned carbon nanotube array becomes at least one of straightened vertically and hydrophilic;
   coating the vertically aligned carbon nanotube array and the plurality of nanotube tips in the treated state with a metal coating that only partially coats the vertically aligned carbon nanotube array so that the vertically aligned carbon nanotube array and the plurality of nanotube tips are in a coated state;
   adhering a plurality of fluorophores to the vertically aligned carbon nanotube array while the vertically aligned carbon nanotube array is in the coated state; and
   wherein the vertically aligned carbon nanotube array is configured to collimate a fluorescence intensity from the plurality of fluorophore, the fluorescence intensity being proportional to a height of the vertically aligned carbon nanotube array.

\* \* \* \* \*